Figure 1:
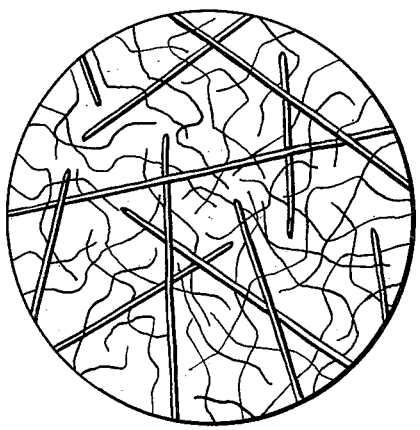

June 25, 1957 W. J. SMITH ET AL 2,797,163
METHOD OF MAKING FILTER MEDIA
Filed Nov. 22, 1952

INVENTORS
RAYMOND W. JAMES
WALTER J. SMITH
BY
ATTORNEY

2,797,163

METHOD OF MAKING FILTER MEDIA

Walter J. Smith, Arlington, and Raymond W. James, Lexington, Mass., assignors, by mesne assignments, to the United States of America as represented by the United States Atomic Energy Commission Application November 22, 1952, Serial No. 322,164

6 Claims. (Cl. 92—21)

This invention relates to a new and improved fibrous material and a method for making the same by a wet process and relates particularly to an efficient, temperature-resistant filter medium having good strength properties suitable as a filter for both gases and liquids.

Several methods for making high efficiency filters have been suggested in the past and such methods have been successful in the manufacture of filters the specifications of which require the retention of ultrafine particles with a low resistance to air flow. Thus, for example, such filters have been made from specially prepared cellulose fibers with minor additions of cotton linter and blue asbestos. The prepared cellulose fibers and cotton fibers are beaten in a paper beater and then mixed with finely divided blue asbestos which is prepared in a separate operation. The mixture is sheeted out in conventional paper-making machinery. In such papers the gross structure is provided by the prepared cellulose and cotton fibers, while the finely beaten asbestos provides the filtering action. Such filter media are capable of retaining well over 99% of particles having a diameter of less than 0.3 micron and show a relatively small pressure drop even at high gas flow rates. Such filter media, however, have only limited temperature and fire resistance and are unsuitable for wet filtration processes.

It has been suggested also that temperature resistant filter media may be made from extremely fine glass fibers in the order of one micron in diameter or less. Such filter media, however, are not only expensive but are difficult to prepare with acceptable strength. In general, it has been found that working with glass fibers as a substitute for cellulose fibers presents a difficulty since the glass tends to gather in balls when being dispersed in water. It has been found that glass fibers can be beaten or mixed in water without gathering into balls when a salt of cationic long chain aliphatic quaternary amine is added. However, the lubricating action of such amines is deleterious to the formation of a strong bonded structure and thus, coherent sheets of suitable strength for filter or similar applications apparently cannot be made in a feasible manner from such dispersions.

An object of the present invention is to produce efficient temperature-resistant filter media of relatively high strength suitable for both dry and wet filtration. Another object of the invention is a method for making filter media containing inorganic vitreous monofilament fibers as the supporting web. Another object is to provide an acid priming medium which will cause the supporting web to accept a bonding resin. Another object is to provide a cationic resin, as the primer. Further objects will become apparent in the following description of the invention.

The present invention is based on the discovery that strong flexible filtering media having a high filtering efficiency and a low pressure drop can be prepared with inorganic vitreous monofilament fibers as the supporting web. The problems of balling up of the vitreous fibers during the beating or dispersing steps and the lack of strength ordinarily inherent in a vitreous fiber sheet are overcome by employing the combination of a dispersing and priming agent to prevent seizure and resulting balling of the vitreous fibers and a flexible bonding resin for holding together the fibers after they have been brought into the form of a mat. As previously mentioned, it is possible to sheet out inorganic vitreous monofilament fibers, such as fiber glass, by dispersing them in water in the presence of a cationic salt of a long chain aliphatic amine. Such sheets, however, are difficult to bond by resinous binders to yield a strong supporting web. We have found and an important part of our invention resides in the fact that inorganic vitreous monofilament fibers can be dispersed, bonded and sheeted out without danger of balling, while giving rise to improved bonding strength, by treating said inorganic fibers with materials capable of substantially reducing the affinity of their surface for each other and at the same time priming them for bonding with polymer dispersions of a nature leading to non-brittle or elastic bonds, by adhering the fibers at intersecting points during sheeting out. It is well understood that the surface of vitreous fibers in aqueous dispersion are hydrated and, depending on the composition, impart a more or less alkaline character to such dispersions. It is believed that the residual forces or valences existing at the surfaces of the fibers cause such fibers to seize each other and also interfere with proper sheeting out thereof and thus prevent proper bonding by the polymers of the kind described. By reducing such surface attraction and rendering the surface compatible with the polymers, the balling of the fibers during the dispersing and mixing steps is not only eliminated prior to sheeting, but full utilization of the bond strength of the said bonding polymers is realized to obtain greatly improved strength.

Figure 2:
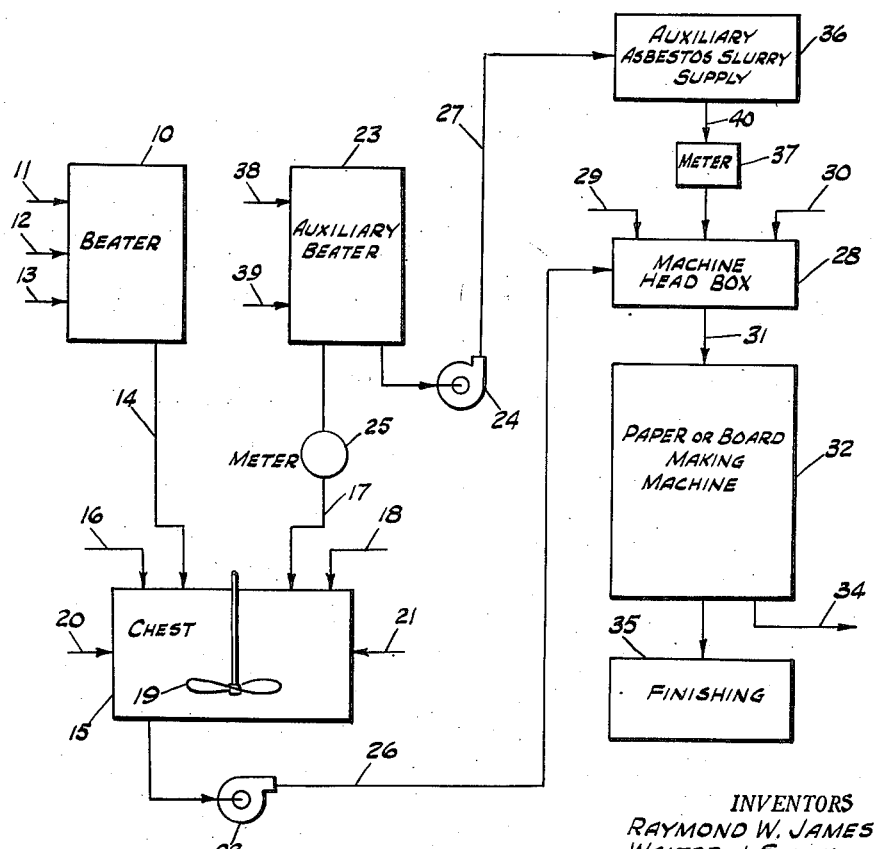

Our invention can be best explained by describing the various steps going into the preparation of such filters and the functions of the various materials utilized in the process, and with reference to the accompanying drawings in which:

Fig. 1 represents an enlargement of the fibrous structure of the filter medium of this invention; and Fig. 2 is a flow diagram for a typical process according to this invention.

The present invention is particularly applicable to the preparation of filter media by the wet process, that is, by preparing a rather dilute dispersion of inorganic vitreous monofilament fibers, hereinafter called "pulp," followed by sheeting out the pulp on any conventional paper machine. By the term "sheeting out" we wish to generally describe a method by which such pulp is converted into its final shape by the removal of water, the interrelationship of the fibers being largely predetermined by their alignment in the pulp. This sheeting out can be accomplished on a Foudrinier machine or on machines as used in the preparation of fiber boards. Alternatively, the pulp can be placed on a porous frame as is employed in the preparation of hand sheets or the water may be removed by any other suitable method while forming the dispersed material into its desired shape. Sheets made in any of the aforesaid ways may be just a few thousands of an inch or several inches thick or more. Shaped articles can also be made by other similar methods.

The tensile strength of media made in accordance with our invention is not dependent upon the material of the vitreous fibers, which of themselves have extremely high tensile strengths, but rather upon the nature and character of the bonds holding the individual fibers together to form a continuous network. It is evident that any fibers or fiber agglomerations which are rolled up upon themselves or balled up and not tightly bonded in fixed relationship to other fibers through the mat will contribute little to the overall tensile strength and that such agglomerations are to be avoided. In the preparation of filter media it is important to obtain materials of satisfactory flexibility and strength, since they have to withstand considerable handling in assembly operations, such as bending, insertion in frames and so on.

For preparing such materials with sufficient flexibility and tensile strength, it is, therefore, important to provide such a continuous, bonded network throughout the mass. It is however, by no means necessary that all the constituents of the finished product be thus bonded. In line with this reasoning, we will use the term "supporting web" in the following to refer to that portion of the finished product which is so bonded and substantially contributes to its strength regardless of whether it forms a major or minor portion of the material or whether other fibrous portions of the material are thus bonded or not.

In accordance with our invention at least the amount of inorganic vitreous monofilament fibers necessary for providing the supporting web will be beaten or dispersed in water. If reduction in length is desired, beating may be accomplished in a paper beater or if the fiber is obtained in the desired length, it may be dispersed in water with a paddle or other suitable stirrer. It is at this step that primers capable of preventing seizing of the vitreous fibers may be added, i. e., before or during and at the end of the beating or dispersing step. If excessive foaming is encountered, only a part of the primer may be added at the beginning of this step and the remainder at the end of the beating or dispersing operation, for example, before or after the stock is charged into the chest. Also, anti-foaming agents, such as octyl alcohol may be added.

Particularly useful for reducing the affinity of such vitreous fibers for each other as well as for priming for the bonding resins are cationic resins or polymers and these constitute a preferred embodiment of our invention. Cationic urea formaldehyde resins have been found particularly suitable. However, other thermosetting resins such as cationic melamine resins or cationic phenolic formaldehyde resins such as resins made from phenol, cresol, resorcinol, and other aromatic hydroxylated compounds condensed with formaldehyde can be utilized, if so desired. Cationic linear polymers such as cationic elastomers, and especially butane derivative lactices are also useful, as well as cationic polymers in general. Such cationic resins are distinguished from the conventional cationics, such as chain aliphatic amine salts in that they form compatible primers for the bonding resins.

Other highly effective means for achieving this purpose are acids capable of acidifying the pulp of the inorganic, vitreous fibers, preferably below pH 4. For most types of inorganic, vitreous fibers, such as commercially available fiber glass, strong mineral acids, such as sulfuric or hydrochloric acid, will be most useful, but for less alkaline fibers such as quartz fibers or alumino-silicate fibers, weaker acids may be just as useful. Acids in conjunction with acid salts, such as sulfuric acid and alum can be used to advantage too.

Other chemicals capable of attaining the desired effects are such substances as long chain aliphatic isocyanates having at least 9 carbon atoms in the aliphatic chain and chrome complexes. Of course, once the principles of this step are understood, suitable equivalents may be readily established by experiment. As previously stated, such primers will be characterized by their lowering the surface affinity of the vitreous fibers to each other and providing a suitable surface for the bonding resins thus promoting superior bond strength.

For the bonding of the primed fibrous vitreous monofilaments the use of flexible polymers is of particular importance since networks formed without the use of such polymers lack the inherently resilient characteristics of structures made from curled and felting fibers, such as those prepared from animal or cellulosic vegetable material. We have found that aqueous acrylic resin dispersions or latices are particularly suitable since they tend to agglomerate on the primed vitreous fibers and to form strong flexible bonds at the points of intersection of the fibers. However, perfectly useful bonds on the primed fibers can be obtained with neoprene latices or latices and dispersions of polyvinyl acetate, polyvinyl chloride, polymeric butane derivatives and similar flexible linear polymers. In many cases it will be furthermore desirable to include plasticizers, fillers, or other usual compounding agents for such flexible bonding polymers to further enhance these physical properties. Of course, copolymers or compatible mixtures of such polymers can be used, if so desired. Where cationic linear polymers are used as the primer, the same polymer may be used as the bonding polymer also or it may be used in combination with such other linear flexible bonding resins as mentioned above. The bonding properties of such flexible polymers will be further greatly enhanced if the acidity of the pulp is increased to pH values below 3, such as particularly to pH 2 or lower.

While most of the ingredients may be added in the beater or mixer, it will frequently be more desirable to prepare some of the ingredients separately and to combine them with the fiber in the paper machine chest or in the head box of the machine or equivalent reservoir.

In the preparation of high efficiency filters, for sake of economy, we prefer to make the supporting web from glass fibers having an average diameter of one or more microns whereby the glass fibers may be the more conventional silicates, alumino silicates, boro silicates of the alkaline earth metals or such other vitreous fibers as more or less pure alumino silicates, vitreous silica, or various rockwools. Finer fibers are, however, perfectly useable and may even be preferred for specific purposes. In any case, the supporting web eventually is to retain in its interstices fibers of suitable size to impart the desired filtering action. Preferably, for high efficiency filters, such fibers shall be in the submicron size, i. e. of a diameter less than one micron. Such fibers for imparting the desired filtering properties may be of a vitreous nature also, or preferably, will be prepared from asbestoes and in particular from blue asbestos types, such as blue African or blue Bolivian asbestos. Such asbestos is preferably beaten to the desired fineness in a separate beating operation or broken down by other suitable means.

At any rate, prior to sheeting out, all constituents are combined including a dispersion of the bonding resin.

If desired, the entire filter medium may be made of one type of fiber and even where only submicron size inorganic monofilament fibers are used, much stronger structures than heretofore possible are obtained.

After sheeting out the shaped articles are dried, and if desired, subjected to a baking step when further curing of the resinous binders is desired or necessary. The finished structure then comprises filtering constituents having as a supporting web inorganic vitreous monofilament fibers bonded together by flexible polymers superimposed on a primer. Such materials are particularly useful as filter media, but are also useful as insulating, acoustical, and other lightweight structural materials.

In Fig. 1, which is an enlargement of a section of the filter medium of this invention, there are shown the large diameter fibers forming the supporting network of the filter medium and the fine inorganic fibers, joined to the large fibers where they cross, which are the filtering fibers.

A typical process of this invention may be shown with reference to the flow diagram of Fig. 2. Into beater 10 are introduced water through line 11, acid and alum through line 12 and the inorganic fibrous material which is to form the supporting network through line 13. (This inorganic fibrous material will hereinafter be referred to as glass for sake of simplicity.) After these materials have been thoroughly dispersed in beater 10 they are led by line 14 into chest 15 which is equipped with a stirrer 19. Into auxiliary beater 23 there are introduced water through line 38 and the inorganic vitreous filtering material through line 39. (This filtering material will be referred to as asbestos as an example of a suitable material.) After the asbestos has been beaten and formed into a uniform water slurry it is led by line 17, which contains a meter 25, into chest 15. Into chest 15 there are also introduced the priming agent through line 16, the binding agent through line 18, additional water through line 21 and any necessary additives, such as anti-foaming and dispersing agents, through line 20. After the components have been thoroughly mixed in chest 15 the dispersion is removed therefrom and by pump 22 directed by line 26 to the machine head box 28. Into machine head box 28 are also brought additional water through line 29, and any necessary additional anti-foaming agent through line 30. When asbestos is used as a filtering material it is preferable to have an auxiliary asbestos slurry supply 36 which is fed by line 27 through pump 24 from the auxiliary beater 23. If control testing indicates the need for further asbestos, an additional quantity of the asbestos slurry is admitted into machine head box 28 from the auxiliary asbestos slurry supply 36 through line 40 which contains meter 37. From machine head box 28 the final dispersion is drawn off through line 31 into any suitable type of paper or board making machine 32. From machine 32 the product then passes into a suitable finishing device 35. Samples may be taken from the dry end of machine 32 to determine the amount of additional asbestos slurry required from the auxiliary supply 36. If fine glass is used in the system in place of asbestos as a filtering material, then the auxiliary slurry supply 36, the meter 37 and pump 24 along with the lines leading to and from them, may be eliminated.

In order to understand our invention more clearly, the following examples are given without, however, intending to limit the scope thereof:

*Example I*

A high efficiency filter was made from the following composition:

Bulk glass fiber, unbonded unlubricated B grade (4–5 micron diam.) _____ 100 parts by weight.
Blue Bolivian asbestos _____ 14.8 parts by weight.
Cationic Urea Formaldehyde resin (40% aqueous solution) _____ 4 parts by weight (based on solids).
Flexible Polyacrylic resin emulsion (40% aqueous emulsion) (binding resin) _____ 2.5 parts by weight (based on solids).

The procedure employed was as follows:

The glass fibers were charged into a paper mill beater and beaten until the original long fibers were broken down by light roll pressure to an approximate length in the range of 0.5 mm. to 5 mm. at a consistency or fiber concentration of one per cent. The beater slurry was pumped into a chest equipped with a slow moving stirring paddle, and the aqueous solution of cationic urea formaldehyde resin (at pH 4.5) added.

In a separate beater operation, the asbestos was beaten at a consistency of one percent with medium roll pressure until the fibers were sufficiently opened. This operation was controlled by observation of the freeness of the slurry. A freeness of 79 was found suitable for the particular lot of asbestos used. For this test a Schopper-Riegler freeness tester was used and the reading was based on a one gram sample of fiber.

Most of the asbestos slurry (about 68 percent) was pumped into the chest to blend with the glass fiber slurry while the remainder was held separately to be added to the paper machine head box at a rate needed to adjust the asbestos concentration and maintain proper air filtering characteristics of the finished medium.

The aqueous emulsion of polyacrylic resin was diluted with ten parts of water and added slowly to the chest contents. Stirring was continued throughout the entire run.

Whenever a tendency to foam or froth formation showed in the chest, it was promptly controlled by the addition of a small amount of octyl alcohol.

In the chest, the overall furnish consistency was about 0.59 percent. The furnish or stock was fed to a slow Fourdrinier machine at about 13.5 feet per minute. A further small addition of octyl alcohol to the machine head box eliminated all foaming. The sheet was dried in conventional fashion.

To test the air filtration efficiency of the filter medium thus produced, a test smoke of dioctyl phthalate (DOP) of 0.3 micron particle diameter was used. While this testing equipment is known to those presently making high efficiency air filters, a brief description of such equipment is as follows:

DOP vapor is generated by passing a stream of air over a pot of liquid DOP heated to 400° F. Upon contact with another stream of cooler air, the DOP vapor condenses to form a liquid aerosol of nearly uniform 0.3 micron particle diameter. The aerosol is then passed through the filter medium to be tested into a light scattering chamber which, by appropriate means permits a direct scale reading of efficiency.

The following test results were given by the filter medium of this run:

| Flow Rate of Air Stream through Filter, Lin. Ft./Min. | Pressure Drop through filter, mm. water | Smoke Penetration, percent going through filter |
|---|---|---|
| 28 | 108 | .12 |
| 28 | 116 | .08 |
| 28 | 107 | .14 |

Thickness of sheet .030″; weight of medium 25 sq. ft. per lb.; tensile strength 1.5 lbs. per inch of width.

This performance compares well with high quality air filter media produced by other methods.

*Example II*

When the medium as described in Example I was tested as a water filter, it was found to retain its form, offered low flow resistance to the water, and gave excellent efficiency. A description of the test follows:

A dispersion of carbon black in water (Aqueous Carbon, Godfrey L. Cabot Co.) with particle size in the range of hundredths of a micron was made by stirring a few grams of the carbon in a liter of water. The water was made optically clean when this dispersion was passed through two layers of the filter medium.

Copper phthalocyanine pigment (particle sizes in a few hundredths of a micron) was dispersed in a liter of water and filtered through two layers of the medium and the color was removed completely.

In tests for removal of living organisms, it was found that the filter was 98% efficient (one pass) for the removal of Serratia Marcenscens.

*Example III*

Bulk glass fiber unbonded, B grade (4–5 micron diameter) _____ 100 parts by weight.
Blue African asbestos _____ 13 parts by weight.
Cationic urea-formaldehyde resin (40% aqueous solution) _____ 4 parts by weight (based on solids).
Flexible polyacrylic resin 40% aqueous emulsion (binding resin) _ 5 parts by weight (based on solids).
Plasticizer for binding resin (butyl glycol phthalate) _____ 0.5 part by weight.

Handsheets made in the laboratory from the above composition in accordance with the method described in Example I tested as follows:

| Flow Rate, Lin. Ft./Min. | Pressure Drop, mm. water | Smoke Penetration, Percent | Tensile Strength, lbs./in. of width |
| --- | --- | --- | --- |
| 28 | 108 | 0.1 | 4.5 |

Example IV

| | |
| --- | --- |
| Bulk glass fiber unbonded B grade (4.5 micron dia.) | 100 parts by weight. |
| Blue African asbestos | 12 parts by weight. |
| Cationic urea-formaldehyde resin, 40% aqueous solution | 3 parts by weight (based on solids). |
| Flexible polyacrylic resin, 40% aqueous emulsion (binding resin) | 4 parts by weight (based on solids). |
| Plasticizer for binding resin (butyl glycol phthalate) | 0.4 part by weight. |

The same procedure was followed in a paper mill run as described in Example I, however, a quarter of the amount of the cationic resin was added at the beater.

Again a satisfactory sheet was produced with improved handling properties over Example I.

Example V

The following composition was prepared in accordance with the method as described in Example I:

| | Parts by weight |
| --- | --- |
| Glass fiber, unbonded and unlubricated (4–5 micron dia.) | 100 |
| Blue African asbestos | 15 |
| Cationic phenol formaldehyde resin | 2 |
| Polyvinylchloride latex | 2 |

Example VI

The following composition was prepared in the laboratory in accordance with the method described in Example I:

| | |
| --- | --- |
| Glass fiber, B grade | 100 parts by weight. |
| Blue African asbestos | 15 parts by weight. |
| Flexible polyacrylic resin (40% aqueous emulsion) | 6 parts by weight (based on solids). |
| Plasticizer for binding resin (methyl glycol phthalate) | 0.6 part by weight. |
| Sulfuric acid | Sufficient acid to lower the pH of the slurry to 3.0. |

Handsheets made from the above composition tested as follows:

| Flow Rate, Lin. Ft./Min. | Pressure Drop, mm. water | Smoke Penetration, Percent | Tensile Strength, lbs./in. of width |
| --- | --- | --- | --- |
| 28 | 104 | 0.31 | 2.75 |

Example VII

If handsheets are prepared from the composition used in Example VI with, however, the pH lowered to 2.0, the following results are obtained:

| Flow Rate, Lin. Ft./Min. | Pressure Drop, mm. water | Smoke Penetration, Percent | Tensile Strength, lbs./in. of width |
| --- | --- | --- | --- |
| 28 | 98 | 0.24 | 3.8 |

Improved formation and handling properties are also a result of lowering the pH from 3.0 to 2.0.

Instead of the acid treatment in Examples VI or VII 2% of isocyanate (for example, octadecyl isocyanate) or 2% approximately of chrome complex (for example, stearato chromic chloride) can be used with equivalent results.

As shown above, the present invention provides a method of preparing substantially inorganic filter media by dispersing fibrous materials in an aqueous slurry, matting out said fibers from the slurry and removing substantially all the water to form the finished product, whereby a flexible coherent supporting web from inorganic, vitreous monofilament fibers is provided by introducing into this slurry a primer which reduces the surface affinity of the said fibers to each other and a dispersion of a flexible polymer as a bonding agent, the said primer being compatible with and aiding the filming out of the said flexible polymer. The supporting web is that portion of the filter medium which is thus continuously bonded and which may retain other fibers as the filtering medium proper, whereby this filtering medium proper may or may not be completely bonded by means of the bonding polymers. Cationic resins are resins which have surface activities similar to cationics in general, but have in the cationic group a resinous radical such as those common to thermosetting resins or linear polymers. Flexible polymers for the purposes of this invention are in general linear polymers which exhibit flexibility, but it is not intended to limit the invention to rubber elastic compounds.

Filter media made in accordance with the present invention have a variety of applications for which they offer unique properties. In the filtration of particulate matter from gases, their preponderantly inorganic nature permits their use under conditions of elevated temperature. Since in such applications the bond strength of the medium is of primary importance only during the assembly of the filter, they can be effectively used even at such temperatures and for such times which may lead to nearly total destruction of the organic bond. The non-swelling character of the inorganic fibers further permits their use in many fields of liquid filtration, such as in chemical filtrations, biological filtrations, decolorizing, etc. The filters according to the present invention furthermore offer the advantage of permitting the use of relatively coarse vitreous fibers in the supporting web, thus leading to strong structures without sacrificing the high efficiency characteristics which may be imparted by retaining extremely fine fibers such as asbestos fibers or fine glass fibers within said supporting web.

The fact that such non-swelling filters can be made, as shown in the examples, to retain particulate matter in sizes larger than 0.01 micron, and the fact that due to this strong flexible nature they can be arranged in a pleated or similar form offering a high surface over a small area, makes such filters particularly suitable for the filtration of colloidal matter, such as bacteria or virus in sizes larger than about 0.01 micron. Such filters then allow rather rapid filtration and purification of contaminated water containing bacteria and virus of particle sizes above the limits indicated above, thus greatly reducing the amounts of chemicals and other sterilizing additions ordinarily required for handling non-filtrable constituents.

We claim:

1. The process in accordance with claim 4 wherein said priming agent is cationic urea-formaldehyde resin.

2. The process in accordance with claim 4 wherein said priming agent and said binder are polyacrylic resin.

3. In the process for forming a filter medium capable of filtering particles in the submicron range which comprises forming a supporting network of inorganic vitreous monofilament fibers, securing the fibers forming said supporting network by a flexible binder and incorporating filtering fibrous material into the interstices of said network, the step of forming an aqueous slurry of said inorganic vitreous monofilament fibers and treating them with a priming agent capable of lowering the surface affinity of said monofilament fibers for each other and of providing a suitable surface for said binder to adhere.

4. In the process for forming a filter medium capable of filtering particles in the submicron range which comprises forming a supporting network of inorganic vitreous monofilament fibers, securing the fibers forming said supporting network by a flexible binder and incorporating filtering fibrous material into the interstices of said network, the step of forming an aqueous slurry of said inorganic vitreous monofilament fibers and adding thereto a priming agent consisting essentially of a cationic resin.

5. Process in accordance with claim 3 wherein said filtering fibrous material is glass fibers having an average diameter less than that of said inorganic vitreous monofilament fibers.

6. Process in accordance with claim 3 wherein said filtering fibrous material is asbestos.

References Cited in the file of this patent

UNITED STATES PATENTS

| | | |
|---|---|---|
| 321,947 | Bryer | July 4, 1885 |
| 2,217,005 | Clapp | Oct. 8, 1940 |
| 2,278,207 | Mathes | Mar. 31, 1942 |
| 2,354,110 | Ford et al. | July 18, 1944 |
| 2,494,392 | Kirkbride et al. | Jan. 10, 1950 |
| 2,563,288 | Steinman | Aug. 7, 1951 |
| 2,563,897 | Wilson et al. | Aug. 14, 1951 |
| 2,568,144 | Cremer et al. | Sept. 18, 1951 |
| 2,582,840 | Maxwell | Jan. 15, 1952 |
| 2,588,794 | Barton | Mar. 11, 1952 |
| 2,601,597 | Daniel et al. | June 24, 1952 |
| 2,601,598 | Daniel et al. | June 24, 1952 |
| 2,611,718 | Steinman | Sept. 23, 1952 |
| 2,626,213 | Novak | June 20, 1953 |

FOREIGN PATENTS

| | | |
|---|---|---|
| 643,603 | Great Britain | Sept. 20, 1950 |
| 672,122 | Great Britain | May 14, 1952 |